May 25, 1965   J. R. MELVIN   3,184,827
TREPANNING TOOL FOR TREPANNING TAPERED METAL SHAPES
Original Filed Sept. 20, 1960   3 Sheets-Sheet 1
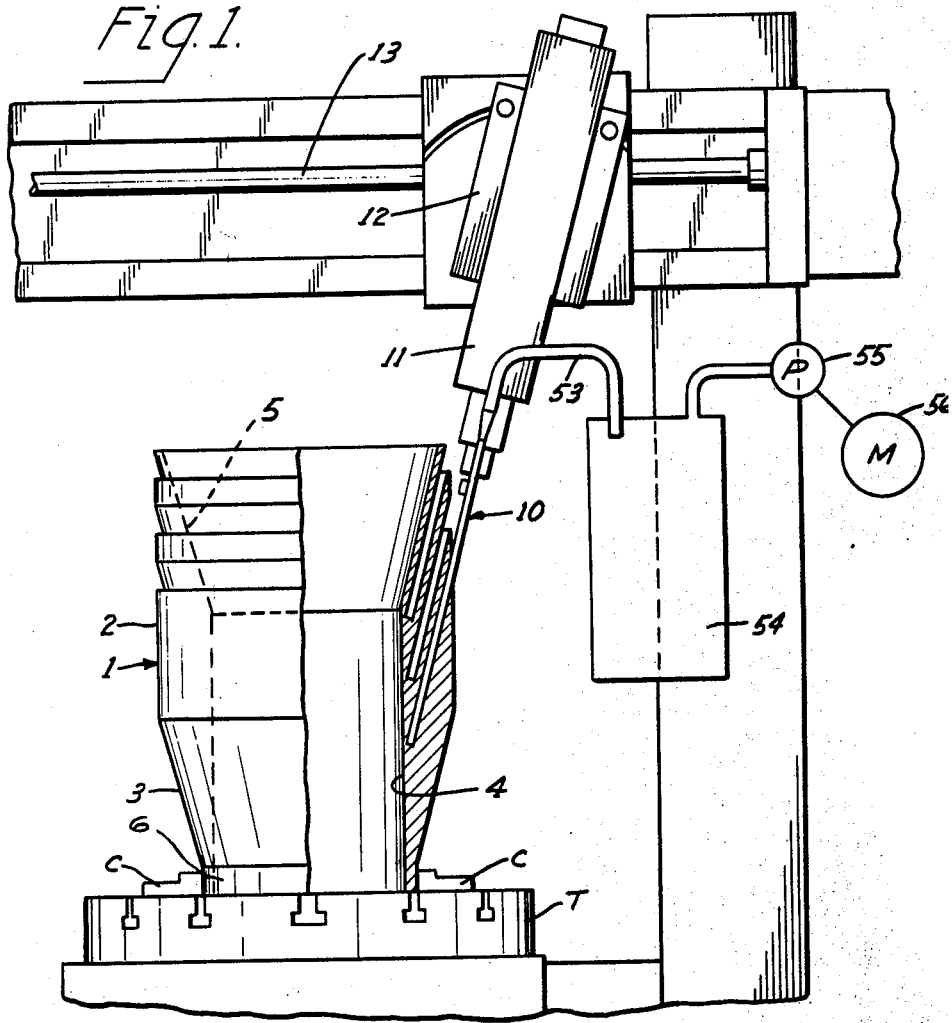
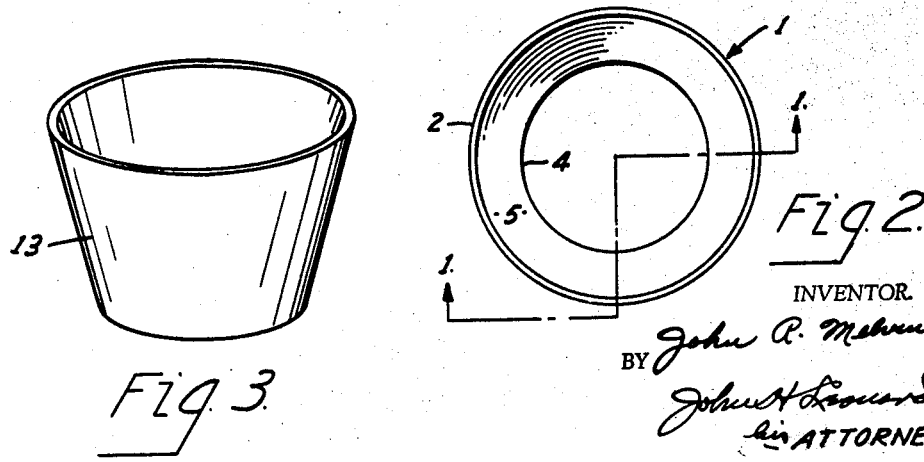
INVENTOR.
John R. Melvin,
BY
John H. Leonard,
his ATTORNEY.

May 25, 1965 J. R. MELVIN 3,184,827
TREPANNING TOOL FOR TREPANNING TAPERED METAL SHAPES
Original Filed Sept. 20, 1960 3 Sheets-Sheet 2
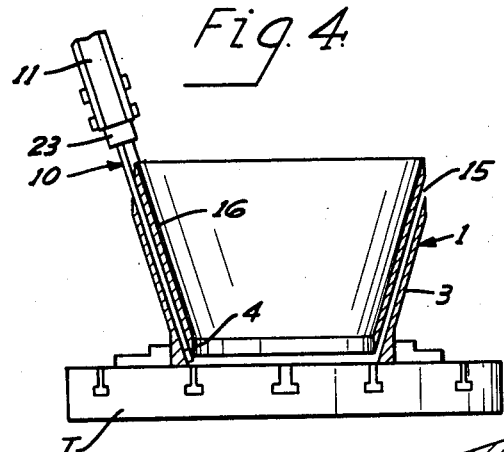
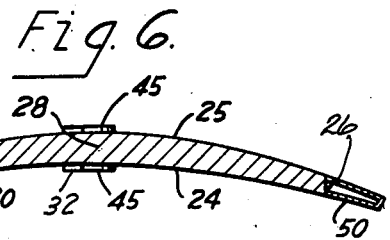
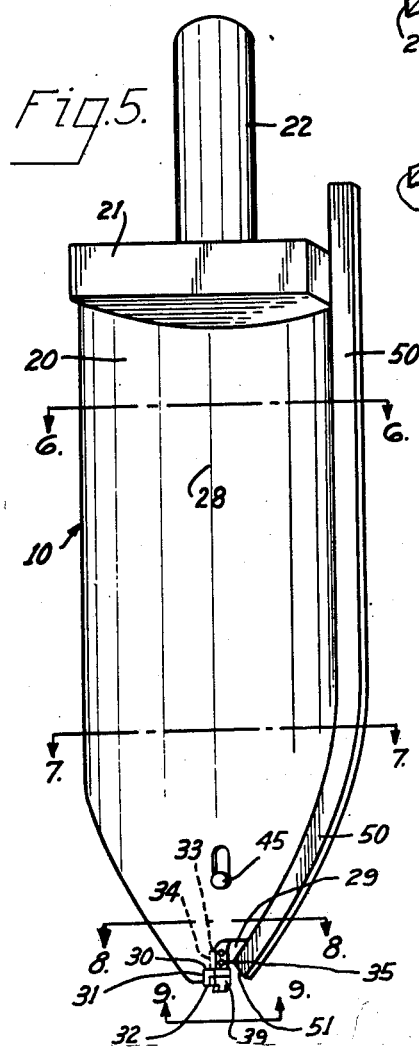
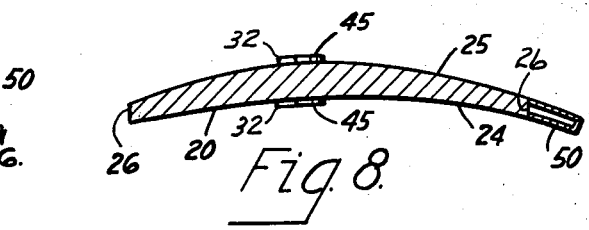
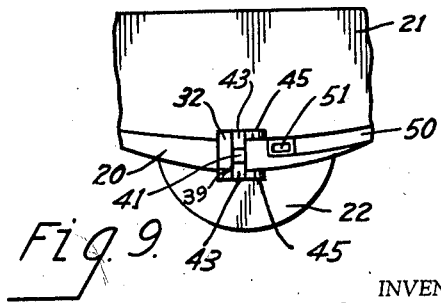
INVENTOR.
John R. Melvin,
BY
John H. Leonard,
his ATTORNEY.

May 25, 1965 J. R. MELVIN 3,184,827
TREPANNING TOOL FOR TREPANNING TAPERED METAL SHAPES
Original Filed Sept. 20, 1960 3 Sheets-Sheet 3
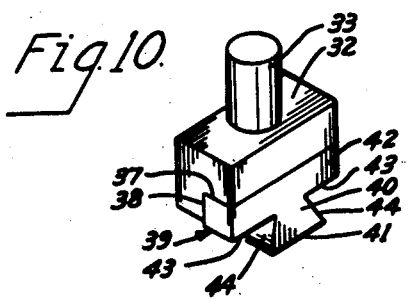
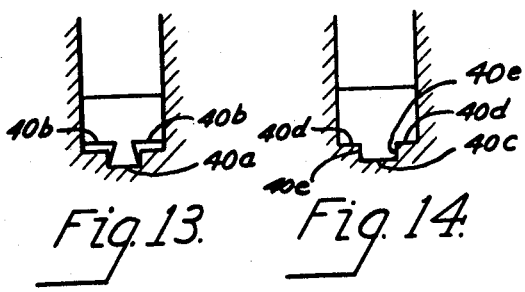
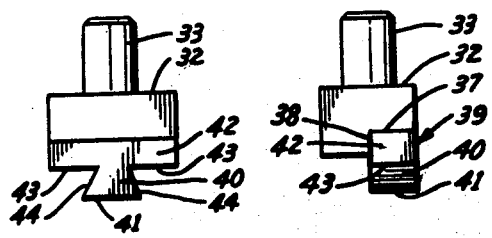
INVENTOR.
John R. Melvin,
BY
his ATTORNEY.

United States Patent Office 3,184,827
Patented May 25, 1965

3,184,827
TREPANNING TOOL FOR TREPANNING
TAPERED METAL SHAPES
John R. Melvin, Parma, Ohio, assignor to The Brush
Beryllium Company, Cleveland, Ohio, a corporation of
Ohio
Original application Sept. 20, 1960, Ser. No. 57,316, now
Patent No. 3,109,232, dated Nov. 5, 1963. Divided
and this application July 19, 1963, Ser. No. 304,709
7 Claims. (Cl. 29—95)

This invention relates to a trepanning tool for trepanning tapered metal shapes, and particularly to a trepanning tool for cutting tapered frusto-conical shells from metal billets.

This application is a division of my copending application Serial No. 57,316, filed September 20, 1960, and entitled "Method and Apparatus for Trepanning Tapered Metal Shapes," now Patent No. 3,109,232, issued November 5, 1963.

More specifically, the invention relates to a trepanning tool for forming of a plurality of identical frusto-conical shells from a billet of beryllium with a minimum waste of the beryllium metal in the form of chips and unused remnants of the billet.

A correlative object is to prepare a billet of beryllium so that substantially all of the billet can be formed into the frusto-conical shells which are identical in shape.

A more specific object is to provide a novel trepanning tool by which accurate frusto-conical kerfs can be cut and removal of chips can be effected without the use of any lubricants, whereby the chips may be used for forming additional billets without cleaning, remelting, and refining.

Another object is to provide a trepanning tool for making a plurality of identical frusto-conical shells from a single metallic billet of beryllium by subjecting the billet to successive trepanning kerfs coaxial with the billet and parallel to each other and sloping inwardly bias to the axis of the billet and spaced from each other axially of the billet, and severing the shells from the billet or from each other successively, as formed or after a number have been formed. The severing may be effected by either cutting the shells apart at the smaller base with a cutting tool, or by making the kerfs so deep that only a small amount of metal remains connecting each shell and the next successive shell or remainder of the billet and then separating each shell by applying sufficient pressure thereto to fracture the small amount of connecting metal.

Other objects and advantages will become apparent from the following description wherein reference is made to the drawings, in which:

FIG. 1 is a side elevation of a billet, part thereof being shown in section as indicated by the line 1—1 of FIG. 2, illustrating the apparatus used in performing the present method and the trepanning kerfs produced thereby;

FIG. 2 is a top plan view of a billet illustrated in FIG. 1;

FIG. 3 is a perspective view of one of the shells formed as illustrated in FIGS. 1 and 2;

FIG. 4 is an enlarged cross sectional view of the lower portion of the billet of FIG. 1, showing the trepanning tool of the present invention in trepanning position in a kerf therein;

FIG. 5 is an enlarged side elevation of the trepanning tool;

FIGS. 6, 7 and 8 are enlarged cross sectional views of the tool and are taken on the lines 6—6, 7—7, and 8—8, respectively, of FIG. 5;

FIG. 9 is an enlarged fragmentary bottom plan view of the tool and is taken from a plane indicated by line 9—9 of FIG. 5;

FIG. 10 is a perspective view of the cutter of the tool;

FIGS. 11 and 12 are a front elevation and a side elevation, respectively, of the tool illustrated in FIG. 10;

FIGS. 13 and 14 are diagrammatic illustrations, respectively, showing the arrangement of tool faces when two tools are used for the trepanning operation;

FIG. 15 is a top plan view of a billet of a different starting shape which may be used in the practice of the invention, showing the initial trepanning kerf;

FIG. 16 is a sectional view taken on the line 16—16 of FIG. 15;

FIG. 17 is a top plan view of a different billet which may be used for the trepanning operation;

FIG. 18 is a sectional view taken on the line 18—18 of FIG. 17;

FIG. 19 is a top plan view of a billet showing another manner of effecting the trepanning operation described in connection with FIGS. 1 and 2;

FIG. 20 is a cross sectional view taken on the line 20—20 in FIG. 19;

FIG. 21 is a perspective view of a billet with kerfs cut therein preparatory to forming slugs, part thereof being shown in section for clearness in illustration;

FIG. 22 is a perspective view of the first or end slug formed from the billet of FIG. 21; and FIG. 23 is a perspective view representing the successive slugs that may be formed from the billet of FIG. 21, part thereof being shown in section for clearness in illustration.

Heretofore, cylindrical shells have been cut from a workpiece by trepanning. Generally, this has been done by rotating the tool or workpiece about an axis and concurrently introducing the cutting tool into the workpiece at the end of the workpiece and then feeding it parallel to the axis of rotation. This may be accomplished either by rotating the workpiece or by rotating the tool, but, in heavier work, the general practice is to mount the workpiece on a rotatable table and turn it against the tool which is held in non-rotative position and advanced toward the plane of the table in a direction parallel to the table axis.

Again, corks and barrel bungs and the like have been formed by arranging knives at an angle to the axis of rotation of a workpiece and forcing the knives into the workpiece from one end along a lineal path directed angularly to the axis, thus producing an annular slit in the material but without removing any material. Usually, this operation is performed either on a material, such as cork, so yieldable that the material to the exterior of the part being formed readily deflects and does not interfere with the knife, or, on somewhat less yieldable material, such as wood, with the cut so near the edge of the piece that the material outwardly from the tool merely fractures and breaks off. An example of the latter is conventional barrel bung. In such cases, the core so formed in the useful finished article.

The present invention, however, has to do with the formation of a plurality of frusto-conical shells from a single billet, particularly from relatively hard metal which is difficult to machine and which has very low elastic deformation. It is applied to the formation of identical frusto-conical shells of beryllium from beryllium billets which may be formed by the method described in U.S. Letters Patent of H. W. Dodds, No. 2,818,339, issued December 31, 1957, or by conventional hot pressing methods.

As pointed out therein, the production of beryllium in a condition to form into billets as therein disclosed is complex and costly. Considering this cost of proceeding from the original material to the billet, it is apparent that if much of the material is lost in the form of chips, the cost of the resulting article is extremely high. Accordingly, the present invention has for a specific object the trepanning of a billet into a plurality of identical frusto-conical shells with a minimum production of chips, with the chips produced and removed without lubricants and other contaminants so that they can readily be reused without subjecting them to chemical cleaners for removing lubricants and other contaminants therefrom, and without the necessity of processing them for converting them to the original beryllium material.

Referring to FIG. 1, a preferred embodiment of the invention is illustrated. A beryllium billet 1 is produced in accordance with the above identified Patent No. 2,818,339. For reasons hereinafter set forth, the billet preferably is formed with its external peripheral wall portion 2 extending the major portion of the length of the billet, cylindrical in form, and with the remaining portion, indicated at 3, frusto-conical and tapering toward the end of the billet. Preferably, the outer surface of the portion 3 conforms in shape as near as may be to the outside peripheral surface of the frusto-conical shells to be cut from the billet. Also, the billet is formed with an internal peripheral wall having a portion 4 which extends from the lower end of the billet near to the opposite end thereof and which preferably is of uniform radius and hence circular in section in a plane normal to the axis of the billet. Near the upper end of the internal wall, the billet has an inner peripheral wall portion 5 which flares outwardly toward the upper end of the billet. The frusto-conical wall portion 5 conforms as near as may be to the interior peripheral wall of the frusto-conical shell to be formed.

The billet, of course, can be formed with both its external and internal peripheral walls in the form of cylindrical surfaces, but the formation described with the frusto-conical wall portions 3 and 5 eliminates to a great degree the wastage of metal which would otherwise occur in the form of an annular frusto-conical plug remnant of the billet above the upper end of the cylindrical wall 4 and in the form of an annular remnant that would occur exteriorly below the lower end of the cylindrical wall portion 2.

If desired, a small neck portion 6 may be left on the lower end of the billet for convenience in clamping it in position on a rotary table T of a boring mill.

As illustrated, the billet is mounted on the table T with its axis upright and the neck portion 6 downwardly and disposed on the upper surface of the table T and securely clamped thereto by suitable clamps C in any conventional manner, so that the ingot is coaxial with and rotatable with the table T.

A trepanning tool, indicated generally at 10, is used for cutting kerfs in the billet in a manner to cut from the billet frusto-conical shells. The tool 10 is mounted on a suitable sliding support 11 slidable in a slideway 12 of the boring mill. The slide 12 is arranged to be fed by a suitable driven gear 13, which is driven in timed relation to the speed of rotation of the table T, all in a well known manner in conventional types of boring mills.

The slideway 12 is adjustable angularly with respect to the axis of rotation of the table, and is mounted in a position such that the tool is movable endwise lineally in a direction generally toward, but bias to, the axis of rotation of the billet and thus bias to a plane normal to the axis of rotation at the point of application of the tool. Thus, upon concurrent rotation of the billet and feed of the slide 11 inwardly, the tool is caused to cut in the billet a frusto-conical kerf having its smaller base at the bottom of the kerf. The tool is arranged so that the cut of each kerf is begun at the outer peripheral surface 2 of the ingot. These kerfs are cut to slope downwardly inwardly toward the axis of the ingot so as to form frusto-conical kerfs the walls of which are parallel generally to the wall 3 at the bottom of the billet.

In the form illustrated in FIG. 1, the kerfs are in spaced relation to each other in a direction axially of the billet and are aligned with or parallel to each other so that the portions therebetween provide the frusto-conical shells. Thus, each kerf cut forms the outer surface of one shell and the inner surface of the next succeeding shell in a direction from the upper end of the billet toward the lower end. Starting at the upper end, the tool is inserted from the outer periphery to cut the desired kerf, is then withdrawn and moved downwardly so as to start the next kerf at a new position along the outer peripheral surface 2, and is then fed inwardly parallel to its original path. This operation is repeated until the entire billet is cut into a series of kerfs and thereby cut into a series of shells.

If desired, a large number of these kerfs can be cut without removing the shells therebetween, but preferably each shell is formed and removed before the succeeding shell is formed. Generally, the kerfs are cut almost to the inner peripheral surface 4, leaving a very small amount of the billet metal adhering to the shell. After this operation, the conventional boring or cut-off tool can be inserted into the central passage of the wall 4 and moved radially outwardly at the required position to remove the remainder of the metal at the bottom of the kerf and thus sever the shell. Again, a cut-off tool can be inserted in the kerf and used to cut radially to remove the remaining metal.

Instead of employing a cut-off tool to cut out the remainder of the metal at the inner peripheral limit and sever the shell, the trepanning tool itself can be run the full length and cut entirely through and thus separating the one shell from the next successive shell. However, this latter practice is not as desirable because of the long extent of overhang of the trepanning tool which must take the shock of breaking through the last film of metal.

In each instance, it is desirable to cut almost to the inner wall portion 4, and then to place wedges in the kerf to hold the formed shell and prevent its being subjected to damaging shocks, then to cut through the inner wall portion 4 to separate the shell.

Preferable to all of these is the procedure wherein the kerf is cut to a point such that the wall thickness connecting the shell and billet is sufficiently thin so that the shell can not only be wedged, but can be subjected to transverse pressure to fracture the remaining thin web of metal and therefore break the shell loose from the remainder of the billet. As mentioned, in the preferred operation each shell is severed before cutting the kerf for forming the next succeeding shell.

Generally, it is preferable to use two tools 10 so that faster cutting can be effected without the danger of too much chip removal per lineal inch of cut per tool, thus facilitating the removal of chips and also preventing overload of a tool. Obviously, since the tool 10 must be extended a substantial distance from its external support on the slide 11 near the end of its cut, it is subject to vibration and shocks which may render it unstable if too great a cut is taken. On the other hand, if only one tool with its limited depth of cut is used, the time of cutting is greatly increased. It is preferable to begin at the outer periphery 2 of the billet and cut inwardly for a number of reasons. First, the tool can be supported additionally, if required, near the zone of initial cutting which is at the outer periphery where, at a given table speed, the lineal speed of cut is greatest. Furthermore, chip removal is facilitated when the depth of cut is shallow and more chips are cut at the larger diameter where the depth of kerf is most shallow. Again, with the use of a plurality of tools, the likelihood of the tools and their slides interfering with each other when their slides are disposed outwardly from the billet and are directed inwardly, is greatly reduced.

However, especially if a single tool is used and each successive shell is cut free or fractured free at the end of its formation, the tool can be moved to cut the kerf from the inner periphery toward the outer periphery. In such instances, as each kerf is formed, each successive shell is removed upon its formation so as not to obstruct and interfere with the introduction of the tool through the central passage defined by the inner peripheral wall 4.

Referring to FIG. 3, there is shown an exemplary frusto-conical shell 13, for instance, one which is 48 inches inside diameter at the top and 30 inches inside diameter at the bottom and with a length of about 30 inches.

It is apparent that for shells of this shape and size, an extremely deep kerf must be formed. On the other hand, it is desirable that the kerf be kept as narrow as possible and for this purpose, the kerf and tool illustrated in FIGS. 4 through 9 is employed.

Referring first to FIG. 4, the lower end of the billet 1 is shown, the remainder having been cut away and formed into frusto-conical shells.

A kerf 15 is being cut by the tool 10 and in this form the tool is shown as going entirely to the bottom of the cut and itself separating the shell from the remainder of the billet.

The shell thus formed is indicated at 16. It is noted that in this form, the tool must be extremely long to extend from the slide 11 to the bottom of the kerf. At the same time, it must be relatively rigid and stable. The tool 10 comprises a thin, wide blade 20 secured at its upper end to a body 21 on which is a shank 22 adapted to be secured in a conventional tool holding head 23 on the lineal slide 11. As illustrated in FIGS. 6 through 9, the blade 20 has one lateral face 24 which is concave about an axis extending lengthwise of the blade and an opposite lateral face 25 which is convex about an axis extending lengthwise of the blade, so that the blade has a shallow concavo-convex cross section and, in a cutting position, is arranged with its concave face toward the axis of the billet. The concave face 24 and the convex face 25 converge toward the edges 26 of the blade from the longitudinal axis 28 of the blade, thus giving the blade a feathered effect. As a result, the blade conforms to the varying radius resulting from the frusto-conical shape of the kerf and the approach of the tool toward the axis of the billet. Likewise, the tool 10, beginning at a distance half way or more down from the upper or shank end, tapers endwise, as shown at the lower portion of FIG. 5, and in the sections 7 through 9. This further prevents any interference and binding of the blade as a result of the decreased radius of the lower or small diameter base of the frusto-conical shell.

At its lower end, the blade 20 has a notched portion 29 with cooperating shoulders 30 and 31 against which a cutting head 32 is seated and held in position by a shank 33 of the cutting head. The shank 33 is received in a socket 34 in the blade and held therein by suitable set screws 35. The head 32 seats against the shoulders 30 and 31 and, in turn, is provided with shoulders 37 and 38 against which a cutting tip 39 is secured by brazing, welding, or otherwise. The tip 39 has a lower central portion 40 with a forward central cutting edge 41 at the bottom and exposed forwardly and extending transversely of the blade. Likewise, it has an upper portion 42 having forward lateral cutting edges 43 at the bottom and exposed forwardly and extending in opposite directions outwardly transversely of the blade. The edges 43 are spaced toward the shank end of the blade from the edge 41.

The lateral walls 44 of the lower portion 40 converge upwardly slightly so as to provide relief for accommodating chips when they are cut loose by the edges 41 and 43. This configuration also facilitates the movement of air past the blade for dislodging chips and causing them to be sucked out of the kerf, as will later be explained.

If two tools are used, generally they are spaced 180° apart. One tool is formed as indicated in FIG. 13 so that the lower portion thereof, indicated at 40a, is longer than normal so that it can cut the central portion of the kerf, the same as the edge 41, without the upper cutting edges 40b concurrently cutting to the full width of the tip. The other tool makes only a light cut in the bottom of the central portion of the kerf already partially formed by the portion 40a, as indicated at 40c. The other edges 40d of the tool at the outer ends of the portion 40a make relatively heavy cuts for the remainder of the width of the kerf at opposite sides of the central portion formed by the part 40a. The lateral walls 40e do not converge upwardly as do the walls 44.

It is desirable that the tool be extremely stable and for this purpose suitable wear and centering pads 45 are provided on the blade, one extending outwardly a short distance from the face 25 and one a short distance outwardly from the face 24. These pads preferably are carbide and are positioned so that they engage the peripheral walls defining the kerf to prevent lateral shifting of the lower end portion of the blade 20. The two wear pads together with the cutting tip 39 provide a three-point stabilizing support for the lower end of the blade 20. The blade is well supported at its upper end. Consequently, an accurate trepanning kerf can be cut even though the cutting edges are disposed a great distance from the shank 22.

Since the forces imposed by the cutting head are edgewise of the blade 20, a high degree of rigidity is provided in a direction tangentially of the kerf for directly resisting the forces imposed by the cutting operation. As a result of this structure, a relatively narrow kerf can be cut with a minimum of chips and more effective use and saving of the formed metal of the billet.

However, there is a question of a certain amount of chips being removed and ordinarily these are removed from kerfs of trepanning tools by use of various types of liquid coolants and lubricants. Such liquids, however, contaminate the chips and require rather expensive processes for rendering the chips usable for reuse. Generally, the chips so contaminated are recovered by remelting into a body and regrinding of the body into powder. In the present invention, instead of removing the chips by such a lubricant or coolant, a suitable suction tube 50 is provided and is secured along the leading edge of the blade 20. The tube 50 is open at its lower end, as indicated at 51, a short distance in front of, and slightly above, the cutting edges. The tube 50 is connected at its upper end by a suitable tube 53 to a vacuum tank 54 which is maintained under sub-atmospheric pressure by a suitable pump 55 driven by a motor 56. The negative pressure is sufficient to draw the chips up the tube and into the tank without any liquids or contaminants and in dry condition. This is facilitated by the undercutting of the lateral faces 44 of the lower portion 40 of the tip 39 so that air can readily be drawn from behind the tool forwardly of the cutting edge into the tube 50. Thus, the chips are recovered without contamination in the form in which they were formed in the kerf. They can be ground to fine powder and reused without any other treatment than the grinding itself.

As mentioned in connection with FIG. 1, it is desirable that the billets as formed in the molding operation be provided with the frusto-conical walls 3 and 5. However, they may be formed with both the inner peripheral wall and the outer peripheral wall cylindrical. For example, as illustrated in FIGS. 15 and 16, a billet 57 having an outer cylindrical wall 58 and an inner cylindrical wall 59 is provided. In this arrangement, of course, the initial kerf is one which removes the remnant 60 of the billet, which remnant becomes scrap. This remnant has a frusto-conical outer wall and a cylindrical inner wall. At the end of the cutting operation, a remnant 61 remains which is also scrapped. The remnant 61 has a frusto-conical inner wall and cylindrical outer wall. The production of such remnants is not desirable unless, of course, there are some shapes being made into which the remnants can be cut with very little left-overs, thus greatly reducing the amount of scrap.

Referring next to FIGS. 17 and 18, there is shown a solid cylindrical billet 62 having an outer wall 63. In applying the method to this shape, the kerfs, indicated at 64, are cut preferably from the outer periphery to a location near to the axis, leaving only a small amount of connecting metal, as indicated at 65, for connecting each successive shell between adjacent kerfs to the remaining unkerfed portion of the billet. Each shell is almost completely conical and can readily be broken off by lateral forces applied to it, after which the upper part of the cone can be cut away to provide the frusto-conical shell. This practice is desirable only if the shell is to be almost a complete cone, or the small cones cut away from near the apices to provide the larger frusto-conical shell portions can otherwise be used.

In FIGS. 19 and 20, there is shown a billet 66 which has a cylindrical outer wall 67 and a coaxial cylindrical inner wall 68. In this form, the trepanning tool is introduced at the inner periphery and the kerf initiated at the wall 68. The tool is fed outwardly bias to the axis toward the other end of the billet to form the kerfs. However, for the reasons hereinbefore set forth, this practice is not advantageous. It introduces certain problems and difficulties in providing adequate room for the tools unless the ingot is of relatively large diameter and the diameter of the internal wall 68 is also very substantial.

In general, with the method and apparatus herein described, frusto-conical shells can readily be cut to a diminishing diameter equal to from about 95% to 66% of the maximum diameter of the larger end of the shell. The degrees of convexity and concavity, edgewise dimension, endwise taper, and edgewise feathering of the tool may be varied for different degrees of curvature and different metals, but without departing from the principles of construction.

In the illustrative example, the blade at the mid-portion adjacent the axis 28 is about ½ inch thick and is tapered, toward the edges, to a thickness of about ¼ inch. The width of the blade, from edge to edge, is about 9 inches at the widest portion. The mid-portion of the blade, edgewise is the portion of maximum thickness. This portion is about one inch wide and extends ½ inch to each side of the axis 28. The length of the blade is about 27 inches, and the wear pads extend back about 1/32 of an inch outwardly beyond the lateral wall surfaces 24 and 25 of the blade. The thickness of the feathered edge of the blade is a maximum of about one-half the thickness of the thick portion at the axis. The thickest portion of the blade is about 1/16 inch less than the overall width of the cutting edges of the cutting head so as to provide a close fit to avoid chips working upwardly beyond the cutting tool itself into the space between the blade 20 and walls of the kerf. The taper of the walls 44 at each lateral edge of the lower portion 40 of the cutting tip 39, for binding of the chips, and for permitting easier removal of them and freeing inflow of air is about 1/32 of an inch upwardly.

The removal of uncontaminated chips is important. The market value of chips which are contaminated so as to require re-melting for re-use is approximately $10.00 per pound, whereas the market value for uncontaminated chips which can be re-used for sintering without any treatment other than grinding to fine powder is about $40.00 per pound.

In some instances, a billet of beryllium may be cut into slugs by cutting a series of coaxial frusto-conical kerfs in the billet at selected locations along its length.

For example, as shown in FIG. 21, a solid billet 70 of from about three to seven inches in diameter is to be cut into slugs 71, such as illustrated in FIG. 22, each of which has a cylindrical portion 72 and a tapered end portion 73.

The kerfs 74, in the case of a solid billet, are cut so as to slope inwardly axially of the billet, preferably beginning the cut in the outer periphery of the billet. The kerf is cut to such a depth that the metal, at the smaller base 75 of the kerf, securing the slug partially severed by the kerf can be broken to free the slug from the billet by forces directly generally transversely of the axis of the kerf. The slug 71 is severed, after the tool is removed from the kerf, by bumping or jarring it with a sharp impact in a direction transversely of its axis. This impact preferably is obtained by a sharp hammer blow, using a hammer having a head of set synthetic organic plastic, such as nylon and the like.

On small billets, of from about three to seven inches in diameter, for example, the smaller diameter may be from ⅓ to ½ of the billet diameter. As the billet diameter increases, the diameter of the smaller base must be reduced to a smaller proportion of the larger base in order to facilitate breaking off of the partially severed slug. Usually a smaller base of about 3½" diameter maximum is the largest that can be broken loose consistently in this manner, regardless of the diameter of the larger base.

Having thus described my invention, I claim:

1. A trepanning tool comprising an elongated thin, wide blade having a leading edge and a trailing edge and lateral faces each extending from one of said edges to the other of said edges, one of said faces being concave about an axis extending lengthwise of the blade and the other of said faces being convex about an axis extending lengthwise of the blade so that the blade has a shallow concavo-convex section which is elongated edgewise of the blade, said blade being feathered edgewise toward its leading edge and toward its trailing edge along at least the major portion of its length to provide decrescent thickness of the blade in opposite directions edgewise from a portion of the blade between, and spaced from, said edges, a holding shank connected to one end of the blade, a cutting tip connected to the other end of the blade, said cutting tip having a leading edge which is a cutting edge and which extends in a direction generally transversely of the blade and outwardly beyond the lateral faces of the blade, wear resistant pads on the blade in closely spaced relation to the tip end of the blade, at least one pad at each lateral face of the blade, each pad having a wear resisting surface facing outwardly from its associated lateral face of the blade, each pad projecting outwardly beyond its associated lateral face of the blade sufficiently far so that it can engage the side walls of a kerf when a kerf is being cut by the cutting tip, and thereby stabilize the blade.

2. The tool according to claim 1 wherein said last mentioned portion extends generally on a straight line passing through the cutting edge of the tip and near to the holding shank.

3. The tool according to claim 2 wherein the blade is of substantially uniform thickness along said line.

4. The tool according to claim 2 wherein said line extends through said pads.

5. The tool according to claim 1 wherein said last mentioned portion is nearer to the leading edge of the blade than to the trailing edge of the blade.

6. A tool according to claim 1 wherein the tip has a bottom central portion with a forward central cutting edge extending transversely of the general plane of the blade and an upper portion with forward lateral cutting edges at each end of the lower cutting edge and spaced endwise of the blade therefrom in a direction toward the shank, and extending transversely of said plane, and the lateral faces of the lower portion sloping inwardly, transversely of said plane, from the bottom of the central portion toward said upper portion.

7. A tool according to claim 1 wherein a suction tube is arranged along the leading edge of the blade and is open at one end near to, and in spaced relation forwardly and upwardly from the cutting edges of the tip for receiving chips formed by the tip, and means for connecting the other end of the tube to a source of subatmospheric pressure.

(References on following page)

References Cited by the Examiner

UNITED STATES PATENTS

| | | | |
|---|---|---|---|
| 730,362 | 6/02 | Geisenhoner | 29—95 |
| 1,451,610 | 4/23 | Gestas | 77—69 |
| 2,683,303 | 7/54 | Pigott | 29—106 |
| 2,730,845 | 1/56 | Ernst | 29—106 |
| 2,863,341 | 12/58 | Rosato | 77—69 |
| 2,869,405 | 1/59 | Wolfe | 77—69 |
| 2,870,836 | 1/59 | Rosato | 77—69 |
| 2,932,083 | 4/60 | De Nicolo | 29—95 X |
| 3,094,016 | 6/63 | Kleine | 77—69 |

WILLIAM W. DYER, Jr., *Primary Examiner.*

ANDREW JUHASZ, *Examiner.*